(12) United States Patent
Baumann et al.

(10) Patent No.: US 6,318,087 B1
(45) Date of Patent: Nov. 20, 2001

(54) DEGASSING SYSTEM FOR POWER PLANTS

(75) Inventors: Peter Baumann, Sulz; Walter Novak, Lengnau; Francisco Leonardo Blangetti, Baden, all of (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/686,929

(22) Filed: Oct. 12, 2000

(30) Foreign Application Priority Data

Oct. 21, 1999 (EP) .................................................. 99810956

(51) Int. Cl.$^7$ ...................................................... F01B 31/00
(52) U.S. Cl. ................................................. 60/657; 60/659
(58) Field of Search ............................ 60/645, 659, 670, 60/657

(56) References Cited

U.S. PATENT DOCUMENTS

| | | |
|---|---|---|
| 2,656,823 | 10/1953 | Hillier . |
| 3,766,020 | 10/1973 | Sieder . |
| 4,385,908 | 5/1983 | Carmichael . |
| 4,478,621 * | 10/1984 | Fabian ........................ 62/31 |
| 4,637,350 * | 1/1987 | Horibe et al. .................. 122/441 |
| 4,729,217 * | 3/1988 | Kehlhofer ..................... 60/39.02 |
| 5,440,871 * | 8/1995 | Dietz et al. ................... 60/39.02 |

FOREIGN PATENT DOCUMENTS

| | | |
|---|---|---|
| 0508585A2 | 10/1992 | (EP) . |
| WO99/23417 | 5/1999 | (WO) . |

* cited by examiner

Primary Examiner—Hoang Nguyen
(74) Attorney, Agent, or Firm—Burns, Doane, Swecker & Mathis, L.L.P.

(57) ABSTRACT

A power plant, from which large amounts of process steam are removed and to which large amounts of make-up water are supplied continuously, has a degassing system (5) for the make-up water supplied, which as part of the condensation system is connected to the condenser (10) of the power plant. Bleed pumps (25) are connected to the condenser (10) via a first suction line (15) and to the degassing system (5) via a second suction line (16) and remove a mixture of steam and non-condensable gases from the power plant. A control member (22, 23), such as for example a regulating valve, a regulating diaphragm or a readjustable restrictor, is arranged in at least one of the two lines (15, 16), with the result that the suction capacity in that line and the distribution of the suction capacity to the two lines (15, 16) can be adjusted during operation of the power plant.

11 Claims, 3 Drawing Sheets

DEGASSING SYSTEM FOR POWER PLANTS

This application claims priority under 35 U.S.C. §§119 and/or 365 to Appln. No. 99810956.5 filed in Europe on Oct. 21, 1999; the entire content of which is hereby incorporated by reference.

FIELD OF THE INVENTION

The invention relates to steam power plants from which large amounts of water or process steam are removed from the circuit continuously, for example for industrial purposes. The invention relates in particular to a system for the simultaneous bleeding of the steam condenser and of the degassing system for the make-up water supplied.

BACKGROUND OF THE INVENTION

The power plants from which large amounts of process steam are removed for industrial purposes are generally known. Relatively large amounts of steam are removed from such power plants for a prolonged or even the entire operating time. In various industrial applications for process steam, such as for example in paper factories, there is no return flow into the water/steam circuit of the power plant. Therefore, the amount of condensate and steam in the circuit has to be maintained by continuously supplying correspondingly large amounts of make-up water.

If only small amounts of make-up water are supplied to a power plant, or if this water is supplied only for a brief period, this make-up water is generally supplied directly to the steam condenser, for example by being sprayed over the tube bundles, where it is degassed in coolers which are present. The steam/gas mixture which is formed is extracted by bleed devices.

By contrast, if large amounts of make-up water are supplied to a power plant over a prolonged period or continuously, this make-up water is firstly degassed in a degassing system and is only then supplied to the condenser. Both degassing means and condenser are connected to bleed pumps which remove the steam/gas mixture from the circuit of the power plant. Compared to a power plant to which small amounts of make-up water are supplied, the demands imposed on the capacity of the bleed system are increased. These capacity demands are often determined by desired limits or ranges for the condenser pressure and for the oxygen content in the condensate which is taken out of the condenser for reuse for steam production. The lower these desired limits and the larger the amounts of steam and make-up water, the greater the demands imposed on the capacity of the extraction system.

FIG. 1 diagrammatically depicts part of a steam power plant with an example of a bleed system from the prior art, which removes the steam/gas mixture from a make-up water degassing means and a condenser. In this case, a suction arrangement is connected to the two units via two lines, each of the two lines having a diaphragm of predetermined aperture size, by means of which the suction capacity at the individual subsystems is predetermined. The size of these individual diaphragms and the ratio of the two diaphragm sizes, for a specific operating load of the power plant, that is to say a specific amount of steam to the condenser, and for a specific amount of make-up water, are such that an oxygen content in the condensate and a condenser pressure which are within the respectively desired ranges are established.

However, in power plants from which process steam is removed for industrial purposes, the amount of process steam removed and the supply of make-up water may vary considerably over time. At the same time, the current consumption and thus the amount of steam to the condenser may also fluctuate. However, if the suction capacities at the degassing system and condenser are predetermined by the diaphragm sizes, while the amounts of steam and make-up water vary, there is no guarantee that the overall system will be optimally set. For example, a predetermined distribution of the suction capacity to condenser and degassing means may lead to a very low oxygen content in the condensate, which is well below the desired limit, while, however, the bleeding of the condenser is insufficient, so that the condenser pressure rises. This reduces the condenser capacity and leads to associated losses in electrical output.

To avoid the risk of insufficient suction capacity, the total capacity of the bleed system may be sufficiently great to ensure that there is sufficient suction capacity for any possible current consumption and for any possible amount of make-up water supplied. However, at lower operating loads and with small amounts of make-up water, this would lead to excess capacity on the part of the bleed system and to unnecessary investment and operating costs.

SUMMARY OF THE INVENTION

The object of the invention is to provide a system for simultaneously bleeding the degassing means and the condenser in power plants of the type described in the introduction, in which the total suction capacity and the distribution of the suction capacities to the individual subsystems is optimized, so that in the event of fluctuation of the current consumption and the amount of make-up water supplied, the oxygen content in the condensate of the condenser and the condenser pressure remain below predetermined limits. The intention is that there should be no excess capacity on the part of the suction for the bleed system, together with the associated costs.

A power plant from which large amounts of process steam are removed and to which make-up water is supplied continuously has a degassing system for the make-up water supplied, which as a subsystem of the condensation system is connected to the condenser. The power plant also has a system with bleed pumps and at least two lines, of which a first line connects the bleed pumps and the condenser and a second line connects the bleed pumps and the degassing system. The invention consists in the fact that a control member, such as for example a regulating valve, a regulating diaphragm or a readjustable restrictor, is arranged in at least one of the lines which connect the bleed pumps to the units to be bled, with the result that the suction capacity in that line or those lines can be varied while the power plant is in operation.

The distribution of the suction capacities to the individual lines is regulated or adjusted by the regulating valve or the readjustable restrictor by changing the aperture size in that line. The regulation and readjustment take place via an automatic control circuit or manually on the basis of measured variables in the water/steam circuit, in particular the pressure in the condenser and/or the oxygen content in the condensate or make-up water system.

Setting the distribution of the suction capacities results in the oxygen content and the condenser pressure being within their desired ranges or reaching a set value.

In a first embodiment, a regulating valve, a regulating diaphragm or an adjustable restrictor is arranged in the line from the bleed pumps to the condenser, the line from the degassing system having a diaphragm of predetermined aperture size. In this way, bleeding of the condenser is regulated or adjusted according to the measured condenser pressure, so that the latter reaches or is below a desired set value. The diaphragm size in the line from the degassing system is designed in such a way that, for a predetermined total suction capacity of the bleed pumps, an oxygen content in the condensate which is in the desired set range is achieved even with the maximum amount of make-up water supplied and the maximum aperture of the control member in the first line.

In a second embodiment, a control member is arranged in the line from the degassing system, while the line from the condenser has a diaphragm with a given aperture. The bleeding of the degassing system is regulated or set according to the oxygen content in the condensate. The size of the diaphragm in the line from the condenser is designed in such a way that for all loads and the associated amounts of steam supplied to the condenser, the condenser pressure is within the desired set range.

In a further embodiment, both lines, that is to say that from the condenser and that from the degassing system, have a regulating valve, a regulating diaphragm or an adjustable restrictor. In this case, both suction lines are regulated according to condenser pressure and oxygen content in the condensate. This allows more precise optimization of the suction capacities and their relationship and of the oxygen contents and condenser pressures which can thus be achieved.

In further embodiments, there are more than two units which need bleeding, in which case the line leading to one unit, to a plurality of units or to all the units has a regulating valve or a regulating diaphragm, by means of which the suction capacities are individually regulated.

The advantage of the bleed system according to the invention is primarily that the total suction capacity of the bleed pumps in all operating situations is optimally distributed to the individual lines and units. The oxygen content in the condensate and the condenser pressure can thus be kept simultaneously within their set range. Elevated condenser pressures and losses of capacity caused thereby can be avoided in this way, and the total capacity of the power plant can be optimized even in the event of fluctuating operating loads and amounts of make-up water.

The regulatability of the distribution of the suction capacities in the individual lines also allows optimization of the total capacity of the bleed pumps. This capacity no longer has to be designed for extreme situations in terms of current consumption and amount of make-up water for predetermined aperture sizes of the diaphragms, but rather can be of smaller design while maintaining an optimized suction ratio, so that it is possible to save costs.

Furthermore, the distribution of the suction capacity can be set or readjusted following test commissioning of the power plant and no longer has to be fixed using a calculation even prior to commissioning.

The several embodiments of the invention are described herein and illustrated in the accompanying drawings in which.

DETAILED DESCRIPTION OF THE INVENTION

Figure 1:
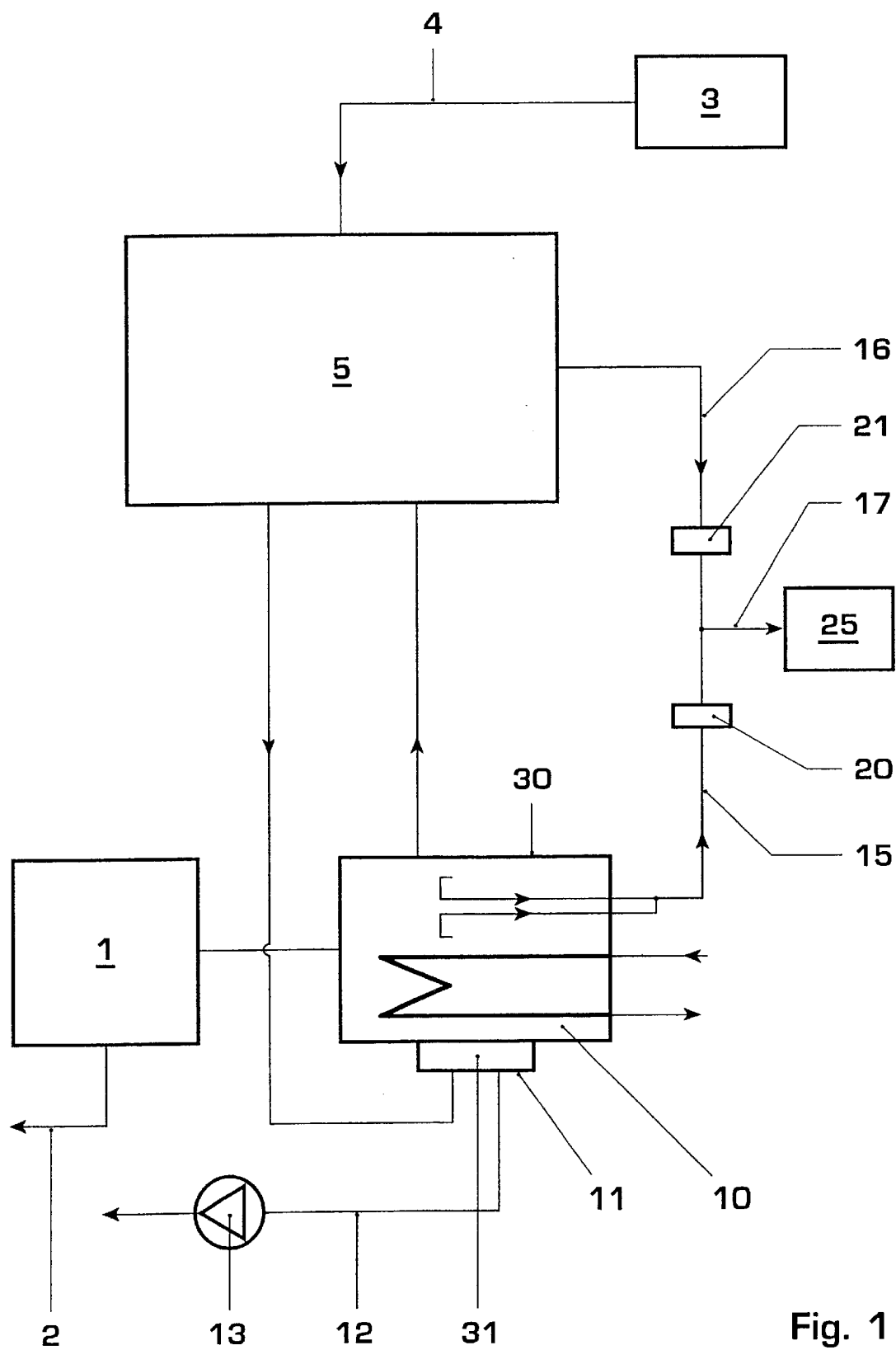
FIG. 1 is a diagram illustrating part of a steam power plant according to the prior art, showing the condensation system, degassing system for make-up water and bleed pumps for both units.

The diagram in FIG. 1 shows part of a power plant from the turbine 1 of which large amounts of process steam are removed via a line 2. The amount of water in the water/steam circuit of the power plant is maintained by make-up water from a make-up water vessel 3. The make-up water is fed to a degassing system 5 via a line 4, after which it is supplied to the condenser 10. The condensate which is formed in the condenser is collected in the hotwell 11 and is finally supplied to the boiler via the line 12 and the pump 13. In the condenser 10 there are coolers, in which non-condensing gases are collected and are extracted via an extraction line as a steam/gas mixture. The degassing system 5 likewise has a line 16, via which a steam/gas mixture is likewise extracted. The extraction lines 15 and 16 are connected to bleed pumps 25 which remove the mixture of steam and non-condensable gases from the circuit. The lines 15 and 16 each have a diaphragm 20 and 21, respectively, the individual aperture sizes of which are predetermined according to an operating point with regard to operating load of the power plant, amount of make-up water and demanded levels for condenser pressure and oxygen content in the condensate. The condenser pressure is in each case established at the measurement point 30 on the condenser, the oxygen content in the condensate is established at the measurement point 31 in the hotwell 11 and/or in the condensate line 12 upstream of the pump 13.

The condenser pressure at the measurement point 30 is the decisive factor for the condenser capacity and electrical output of the power plant, and the oxygen content in the condensate at the measurement point 31 is the decisive factor for the quality of the water and steam in the circuit. The absolute and relative aperture sizes of the diaphragms 20 and 21 are determined according to the required levels for condenser pressure and oxygen content. The aperture sizes are selected in such a way that these levels are as far as possible reached or not exceeded at the various operating loads and amounts of make-up water supplied. For this purpose, for example, two boosters are used, by means of which the suction capacity required can be reached in extreme situations.

Figure 2:
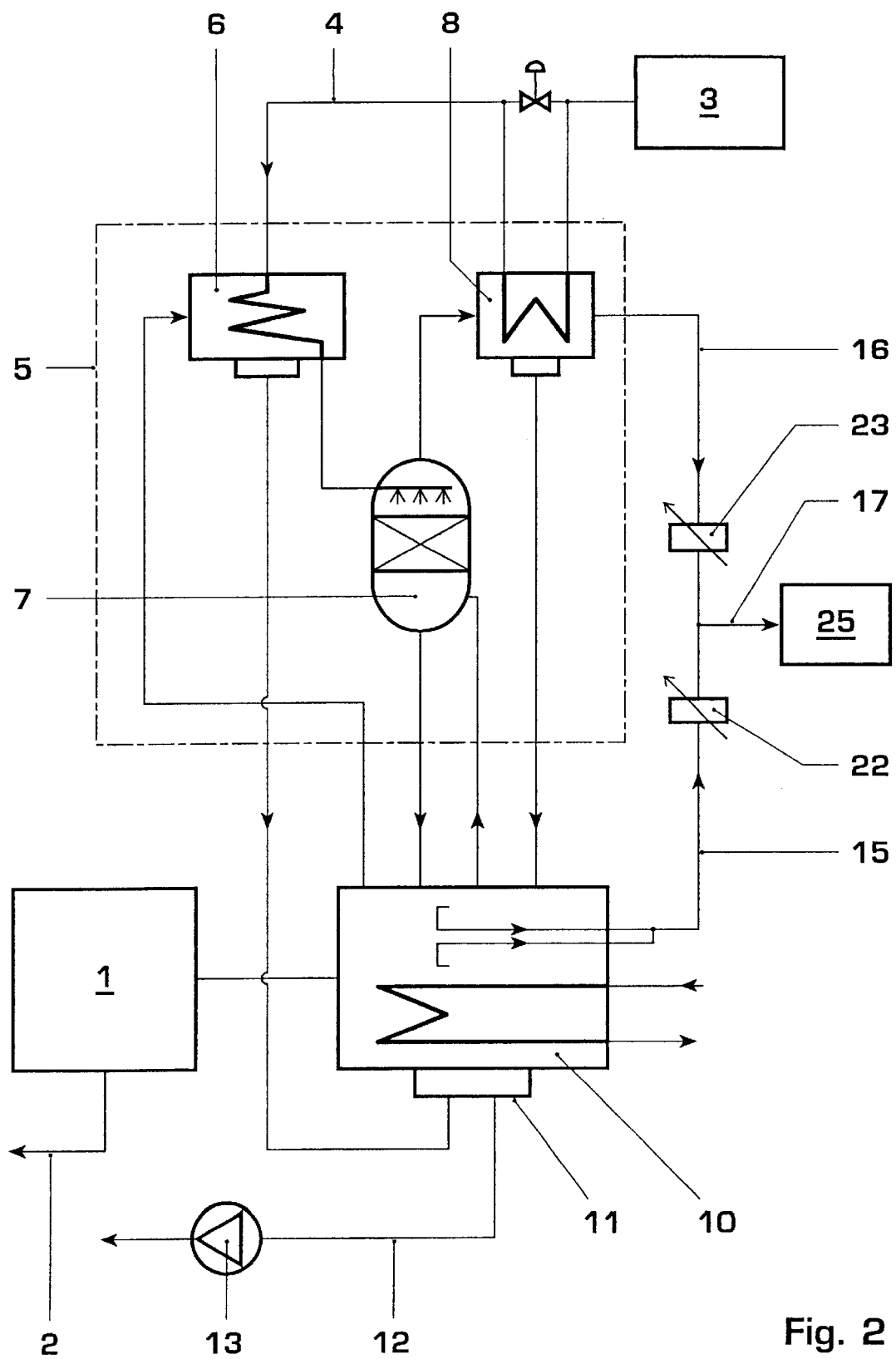
FIG. 2 is a diagram illustrating part of a steam power plant of the same type as in FIG. 1 with a system for the novel bleeding of the condenser and the vacuum-degassing system.

FIG. 2 shows a diagram of a part of a power plant of the same type as in FIG. 1, with a large amount of process steam being removed and a system for supplying and degassing large amounts of make-up water which is supplied to the water/steam circuit continuously. Once again, it has bleed pumps 25 for extracting a steam/gas mixture from the degassing system 5 and the condenser 10. The degassing system 5 comprises, for example, a make-up water preheater 6 and a downstream vacuum degassing means 7 and outgoing-air condenser 8.

The bleed pumps 25 are in turn connected to the condenser 10 and the degassing system 5 via the lines 15 and 16, respectively. According to the invention, a control member 22, such as for example a regulating diaphragm, a regulating valve or a manually adjustable restrictor, is arranged in the extraction line 15 leading to the condenser. The aperture of a regulating diaphragm or a regulating valve is regulated via a control circuit according to the measured values for the condenser pressure at the measurement point 30. For example, if the condenser pressure is high, the size of the diaphragm 22 in the line 15 leading to the condenser 10 is increased. If the condenser pressure is very low, the diaphragm is closed slightly, so that the suction capacity to the degassing system does not fall too low. In the case of a manually adjustable restrictor, the diaphragm aperture is initially set according to calculations. After commissioning, the diaphragm aperture is optimized by manual adjustment of the restrictor. The set value for the condenser pressure may, for example, be adjusted to the particular operating conditions of the power plant, for example as a function of the cooling-water inlet temperature and the turbine output.

The total suction capacity of the bleed system is, for example, distributed in proportions of ⅔ to the line leading to the condenser and ⅓ to the line leading to the degassing system. With regard to the power generated by the power plant, the condenser pressure is the more critical factor rather than the oxygen content in the condensate. For this reason, in a preferred embodiment of the invention the line 15 leading to the condenser 10 is equipped with a regulating diaphragm or an adjustable restrictor 22. On the other hand, the extraction line 16 leading to the degassing system 5 has a diaphragm 23 with a predetermined, invariable aperture, since the suction capacity in this line is less critical compared to that in the line leading to the condenser.

In another embodiment, a control member 22 and 23 is arranged in each of the two lines 15 and 16. In this case, the suction capacities in the two lines are regulated or readjusted. By way of example, a regulating diaphragm whose aperture is regulated according to the condenser pressure by means of a control circuit is arranged in the line 15 leading to the condenser. In the line 16 leading to the degassing system there is an adjustable restrictor which is fine-adjusted manually according to oxygen content levels after commissioning. For example, if the oxygen content in the condensate is above the required limit, the size of the diaphragm 23 in the line 16 leading to the degassing system is increased accordingly, in order to increase the suction capacity, until the oxygen content reaches or falls below the limit. The ratio of the suction capacities in the two lines can, as mentioned above, be set in the most favorable operating point for the power plant.

Figure 3:
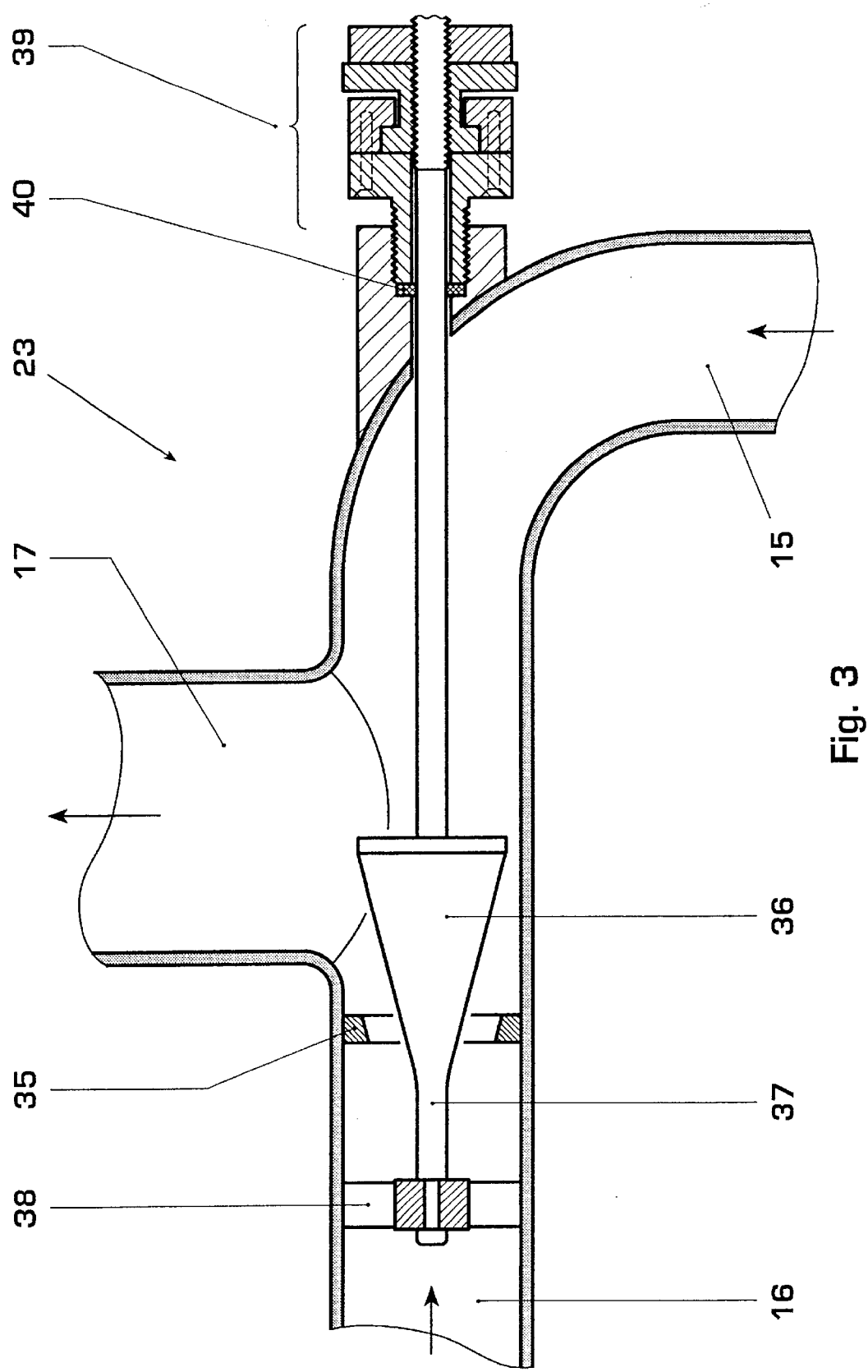
FIG. 3 is a cross-sectional view of a regulatable or adjustable diaphragm in use in the bleed system according to the invention.

FIG. 3 shows an example of a control member for carrying out the invention. A line 17 which leads to the bleed pumps is divided into two sublines, namely the line 15 leading to the condenser and the line 16 leading to the degassing system, at a T-piece. In the line 16 there is a diaphragm 35, the aperture of which can be varied by means of a cone 36. The cone 36 is mounted by means of a spindle 37 passing through a centering piece 38 and a seal 40. The position of the one 36 is manually displaceable with respect to the diaphragm 35 by means of a fixing element 39, so that the size of the diaphragm aperture can be increased or reduced.

By regulating or fine-adjusting the individual diaphragm apertures and distributing the suction capacity to the two lines 15 and 16 it is on the one hand possible to optimize the condenser pressure and oxygen content. On the other hand, the total capacity required from the bleed system can be optimized and, by way of example, the bleed system can be equipped with only one booster instead of two.

According to a first method, the oxygen content in the condensate is measured in the hotwell 11 of the condenser 10 upstream of the condensate pump 13. At this point, the oxygen content level is not distorted. Measurement downstream of the condensate pump 13 would lead to inaccuracies or uncertainty with regard to the measured value, owing to possible leaks in the area of the system of pumps.

However, the reduced pressure means that measuring the oxygen content in the hotwell 11 is associated with difficulties. To circumvent these difficulties, the oxygen content can be determined using an alternative, indirect method. Instead of the oxygen content in the condensate being measured directly, the amounts of oxygen to be removed from the condensate and the make-up water are determined indirectly by measuring the amount of make-up water supplied and then adjusting the diaphragm apertures accordingly.

For this purpose, calibration values are recorded for the present power plant. For each amount of make-up water supplied, the required diaphragm apertures which bring about the respectively optimum distribution of the suction capacity between degassing means and condenser are determined, with the result that an oxygen content in the condensate and a condenser pressure which lie within the desired ranges are achieved. Such calibration values are calculated for all operating states and operating loads, such as for example for various operating loads according to current consumption and for various operating states according to different amounts of process steam removed and of make-up water supplied.

The invention can also be used in power plants with more than two units which need bleeding. For example, a further vacuum degassing means may be connected to the bleed system. In one embodiment, by way of example, the distribution of the suction capacity is regulated by a diaphragm with fixed apertures in one of the lines and a regulating diaphragm in each of the other two lines. In another embodiment, the distribution is determined by a control member in each of the three lines.

In further embodiments of the invention, the control members 22 and 23 are set according to other operating parameters, such as for example the oxygen content in the make-up water, the inlet or outlet temperature of the cooling water, the rise in cooling-water temperature in selected cooling tubes in the condenser, the steam removal, the amount of make-up water and the generator output.

List of reference numerals

1 Turbine
2 Line leading to the boiler
3 Make-up water vessel
4 Line leading to the degassing system
5 Degassing system
6 Make-up water preheater
7 Vacuum degassing means
8 Outgoing-air condenser
9 Condenser
10 Hotwell
11 Line
12 Pump
13 Extraction line between condenser and bleed system
14 Extraction line between degassing system and bleed system
16 Diaphragm of invariable size
20 Diaphragm of invariable size
21 Regulating diaphragm or readjustable restrictor
23 Regulating diaphragm or readjustable restrictor
25 Bleed pumps
30 Measurement point for condenser pressure
31 Measurement point for oxygen content in the condensate
35 Diaphragm
36 Cone
37 Spindle
38 Centering piece
39 Fixing element
40 Seal

What is claimed is:

1. A power plant having a turbine and a condenser, from which large amounts of process steam are removed and to which large amounts of make-up water are supplied, having a degassing system for degassing the make-up water supplied, which as part of the condensation system of the power plant is connected to the condenser of the power plant, having bleed pumps for bleeding the condenser and degassing system, and having at least two lines, of which a first line connects the bleed pumps to the condenser and a second line connects the bleed pumps to the degassing system, and in at least one of the lines there is arranged a control member for adjusting the suction capacity during operation of the power plant in that line.

2. The power plant as claimed in claim 1, wherein the control member is arranged in the first line, which connects the bleed pumps to the condenser, and the second line, which connects the bleed pumps to the degassing system, has a diaphragm with a predetermined aperture size.

3. The power plant as claimed in claim 1 wherein the control member is arranged in the second line, which connects the bleed pumps to the degassing system, and the first line, which connects the bleed pumps to the condenser, has a diaphragm of predetermined aperture size.

4. The power plant as claimed in claim 1, wherein one control member is arranged in the first line, which connects the bleed pumps to the condenser, and in the second line, which connects the bleed pumps to the degassing system.

5. The power plant as claimed in claim 1, wherein a third line connects the bleed pumps to the degassing system, and this third line has a diaphragm of predetermined aperture size.

6. The power plant as claimed in claim 1, wherein a third line connects the bleed pumps to the degassing system, and this third line has a control member.

7. The power plant as claimed in claim 1, wherein the control member or the control members comprise(s) a regulating diaphragm, a regulating valve or an adjustable restrictor.

8. The power plant as claimed in claim 7, wherein the regulating diaphragm or the regulating valve is regulated by means of a control circuit in accordance with measured values for the pressure in the condenser and/or the oxygen content in the condensate in the condenser.

9. The power plant as claimed in claim 7, wherein the regulating diaphragm or the regulating valve is controlled by means of a control circuit according to the oxygen content in the make-up water, the inlet or outlet temperature of the cooling water, the rise in cooling-water temperature in selected cooling tubes in the condenser, the steam removal, the amount of make-up water or the generator output.

10. The power plant as claimed in claim 7, wherein the adjustable restrictor is set manually according to measured values for the pressure in the condenser and/or the oxygen content in the condensate in the condenser.

11. The power plant as claimed in claim 7, wherein the adjustable restrictor is set manually according to the oxygen content in the make-up water, the inlet or outlet temperature of the cooling water, the rise in cooling-water temperature in selected cooling tubes in the condenser, the steam removal, the amount of make-up water or the generator output.

* * * * *